No. 741,931. PATENTED OCT. 20, 1903.
A. W. SANDELL.
MOTOR VEHICLE.
APPLICATION FILED OCT. 18, 1902.
NO MODEL.
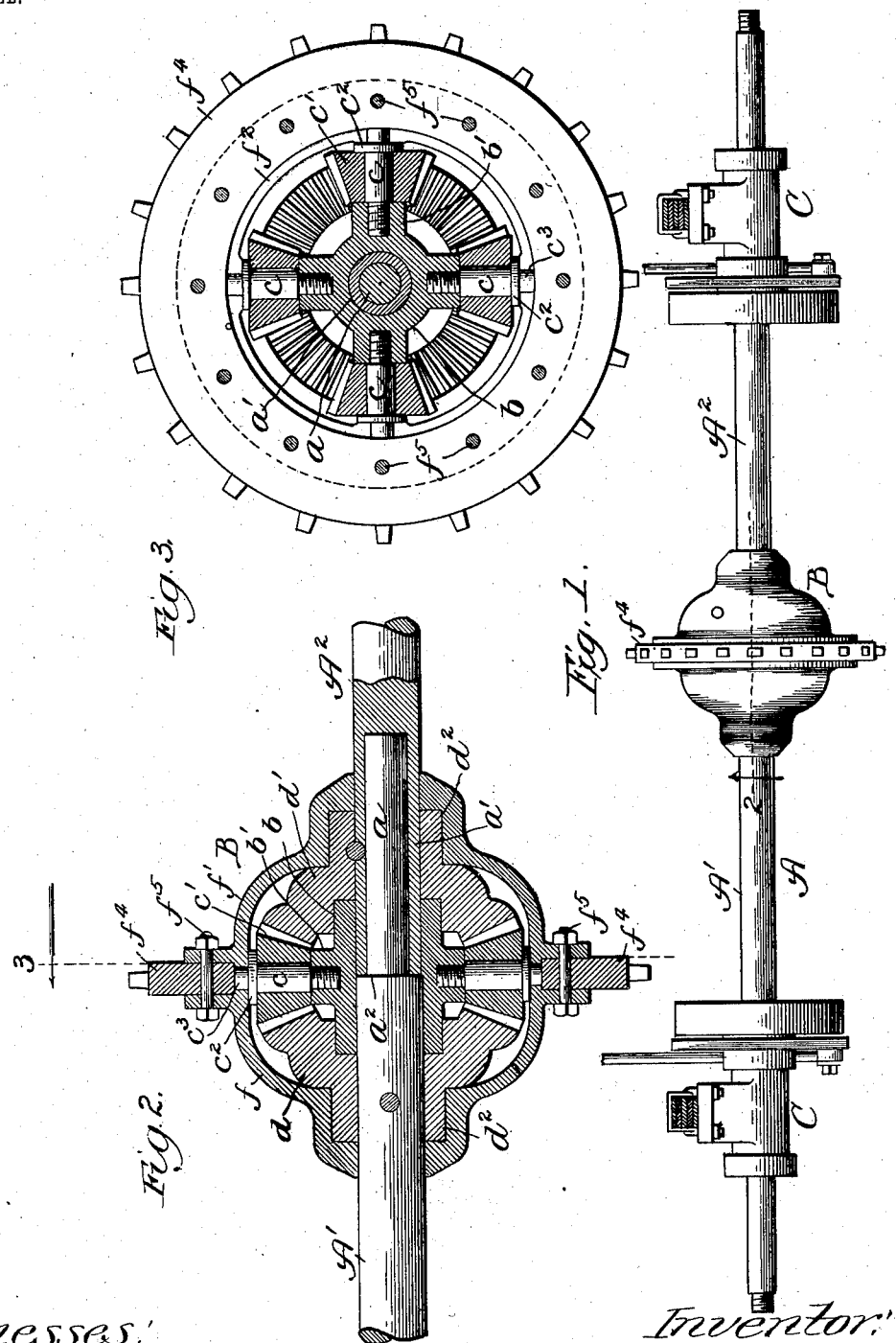
Witnesses:
Inventor:
Axel W. Sandell,
By Dyrenforth, Dyrenforth & Lee,
Attys.

No. 741,931. Patented October 20, 1903.

UNITED STATES PATENT OFFICE.

AXEL W. SANDELL, OF CHICAGO, ILLINOIS, ASSIGNOR OF ONE-HALF TO JACOB LAUTH, OF CHICAGO, ILLINOIS.

MOTOR-VEHICLE.

SPECIFICATION forming part of Letters Patent No. 741,931, dated October 20, 1903.

Application filed October 18, 1902. Serial No. 127,840. (No model.)

*To all whom it may concern:*

Be it known that I, AXEL W. SANDELL, a citizen of the United States, residing at Chicago, in the county of Cook and State of Illinois, have invented new and useful Improvements in Motor-Vehicles, of which the following is a specification.

My invention relates particularly to the driving-axles and compensating gears of motor-vehicles; and my primary object is to simplify and strengthen the construction of this portion of the vehicle.

My invention is illustrated in its preferred embodiment in the accompanying drawings, in which—

Figure 1 represents a view of the complete axle and compensating gear; Fig. 2, an enlarged broken sectional view taken as indicated at line 2 of Fig. 1, and Fig. 3 a section taken as indicated at line 3 of Fig. 2.

In the construction shown, A represents a divided axle comprising sections $A'$ $A^2$; B, a compensating gear connected with the axle-sections; C, journal-boxes of any suitable construction in which the axle is journaled and which serve to support the vehicle-springs, and D D' brakes of any suitable construction applied to the axle-sections at the inner ends of the journal-boxes.

The axle-sections $A'$ and $A^2$ are of the same diameter, and the section $A'$ has a reduced inner end portion $a$, which fits snugly but revolubly within a bore or socket with which the adjacent end of the section $A^2$ is provided. Thus the section $A^2$ has, in effect, a sleeve extension $a'$, the end of which abuts against a shoulder $a^2$ at the base of the reduced extension $a$, while the extremity of the extension $a$ abuts against the bottom of the bore. Upon the axle is journaled a sleeve or hollow member $b$, equipped with a plurality of radial hubs $b'$ and constituting the central member of the compensating gear. The hubs $b'$ are bored and threaded internally to receive radial pinion-bearings $c$, upon which are journaled bevel-pinions $c'$. Each bearing $c$ comprises a portion upon which the pinion is journaled and has a threaded inner end screwed into the corresponding radial hub $b'$, a flange $c^2$, which engages the outer end of the pinion, and a reduced outer end $c^3$. Fixedly secured upon the axle-sections are bevel-gears $d$ $d'$, which mesh with the pinions $c'$. Each of said bevel-gears is counterbored at its inner side, affording an annular opening adjacent to the axle-section into which fits snugly but revolubly the adjacent end of the sleeve $b$. Each of said bevel-gears also has an outwardly-extending hub $d^2$, as shown. The bevel-gears $d$ $d'$ should be incapable of any movement upon their respective axle-sections and may be secured by shrinking them upon the axle-sections and passing pins through, as shown. Journaled upon the axle-sections and the hubs $d^2$ are casing-sections $f f'$, counterbored at the inner sides of their hub portions, as shown, to receive the hubs $d^2$, the bottoms of the counterbores abutting against the ends of the hubs $d^2$. The casing-sections have meeting edges $f^2$, provided with half-circular radial grooves which form sockets for the portions $c^3$ of the bearings $c$, and circumferential flanges $f^3$ are provided near the meeting edges of the casing-sections, between which is secured a sprocket-wheel $f^4$. The casing-sections and the sprocket-wheel are secured together by bolts $f^5$ passing through said flanges and through the wheel.

It will be perceived that the casing really comprises the body of the sprocket-wheel, that the casing and sleeve $b$ revolve with the sprocket-wheel, that power can be transmitted through the pinions and bevel-gears to the axle-sections, and that one axle-section may stop while the other continues to rotate when the vehicle turns. The casing evidently serves to prevent separation of the axle-sections by force transmitted through the casing-section hubs to the hubs $d^2$ of the bevel-gears. It is noteworthy that the axle is strengthened by the member $b$ fitting over the joint at the shoulder $a^2$ and again by the bevel-gears fitting over the member $b$ and still again by the casing-hubs fitting over the bevel-gear hubs.

While I have shown what is commonly known as a "divided" axle, it is obvious that many advantages of the present construction would be retained if the extension $a$ of the axle-section $A'$ were to be prolonged and supplied with a spindle, and the bore which receives it correspondingly prolonged till the axle-section A² becomes a sleeve throughout its length, to which the corresponding wheel is fixed. The compensating gear could of course be located near the right-hand journal-box. Obviously, also, it would be within the scope of my invention to form the rigid extension $a$ on the axle-section A' in any practicable manner. The preferred method is to turn down a solid axle-section to form the extension.

Changes in minor details of construction within the spirit of my invention may be made. Hence no undue limitations should be understood from the foregoing detailed description.

What I regard as new, and desire to secure by Letters Patent, is—

1. In combination, two axle-sections having abutting shoulders, a central sleeve covering the joint of said axle-sections, bevel-gears facing each other each gear being fixed to an axle-section and having a recess receiving an end of the sleeve, casing-sections each having a recess receiving a hub portion of one of said gears, said casing-sections being connected together, bevel-pinions meshing with said gears, and journals for said pinions each confined at its ends respectively in a socket in the sleeve and a socket between the casing-sections, and each having a collar confining the pinion.

2. In combination, two axle-sections one of which has a reduced end entering a recess in the other section the ends of the sections abutting against each other, a sleeve covering the joint of said sections, bevel-gears facing each other each gear being fixed to an axle-section and having a recess receiving an end of the sleeve, casing-sections each having a recess receiving a hub portion of one of said gears, a sprocket-ring interposed between and connected to said casing-sections, a plurality of bevel-pinions meshing with said gears, and journals for the pinions each confined at its ends respectively in a recess in the sleeve and in a recess between the casing-sections, and a collar on each journal confining the pinion thereon.

AXEL W. SANDELL.

In presence of—
L. HEISLAR,
ALBERT D. BACCI.